US009632612B2

(12) United States Patent
Kyrynyuk

(10) Patent No.: US 9,632,612 B2
(45) Date of Patent: Apr. 25, 2017

(54) CIRCUITS, SYSTEMS, AND METHODS FOR PROCESSING THE PROXIMITY OF LARGE OBJECTS, INCLUDING LARGE OBJECTS ON TOUCH SCREENS

(75) Inventor: Valeriy Kyrynyuk, Novoyavorivs'k (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 655 days.

(21) Appl. No.: 13/431,401

(22) Filed: Mar. 27, 2012

(65) Prior Publication Data

US 2013/0222332 A1 Aug. 29, 2013

Related U.S. Application Data

(60) Provisional application No. 61/602,385, filed on Feb. 23, 2012.

(51) Int. Cl.
*G06F 3/044* (2006.01)
*G06F 3/041* (2006.01)
*G06F 3/0488* (2013.01)

(52) U.S. Cl.
CPC .......... *G06F 3/0416* (2013.01); *G06F 3/0488* (2013.01)

(58) Field of Classification Search
CPC .. G06F 3/0416; G06F 3/0488; G06F 3/04883; G06F 3/04886
USPC ..... 345/173–178; 178/18.01–18.11; 715/863
See application file for complete search history.

(56) References Cited

U.S. PATENT DOCUMENTS 7,755,612 B2 7/2010 Park et al.
7,782,296 B2 8/2010 Kong et al.
7,812,828 B2 10/2010 Westerman et al.
8,077,057 B2 12/2011 Ohshita et al.
2008/0062151 A1 3/2008 Kent
2010/0117961 A1 5/2010 Westerman
2010/0127995 A1* 5/2010 Rigazio et al. ............... 345/173
2011/0148801 A1 6/2011 Bateman et al.
2011/0261020 A1 10/2011 Song et al.
2011/0310040 A1 12/2011 Ben-Shalom et al.
2012/0001861 A1 1/2012 Townsend et al.
2012/0023459 A1* 1/2012 Westerman ................... 715/863
2013/0328832 A1* 12/2013 Boumgarten ................. 345/174

OTHER PUBLICATIONS

Mark Micire, et al._Hand and Finger Registration for Multi-Touch Joysticks on Software-Based Operator Control Units_6 pages.
Search Report for U.S. Appl. No. 13/431,401, Dated Mar. 2012, 18 pages.

(Continued)

*Primary Examiner* — Amare Mengistu
*Assistant Examiner* — Stacy Khoo
(74) *Attorney, Agent, or Firm* — Morgan, Lewis & Bockius LLP

(57) ABSTRACT

A method of sensing at least one object in proximity to an array of sensors can include making a determination that an object greater than a predetermined size has been detected; defining an ignore zone that includes sensor locations of the object and sensor locations surrounding those of the object; and removing the ignore zone after a predetermined duration; wherein the proximity of objects outside of the ignore zone are processed differently than the proximity of objects inside of the ignore zones.

20 Claims, 16 Drawing Sheets

(56) References Cited

OTHER PUBLICATIONS

Stantum Announces Palm Detection for Its Patented Multi-Touch Technology_Dated 2010_4 pages.
Cypress, International Search Report and Written Opinion, PCT/US2012/052703, Nov. 6, 2012, 7 pgs.
Cypress, International Preliminary Report on Patentability, PCT/US2012/052703, Aug. 26, 2014, 6 pgs.

* cited by examiner

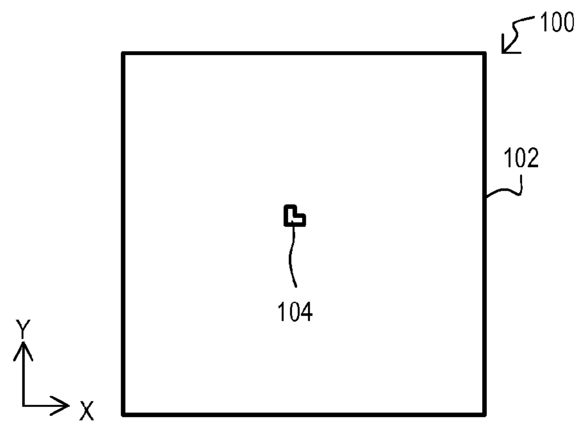
FIG. 1A
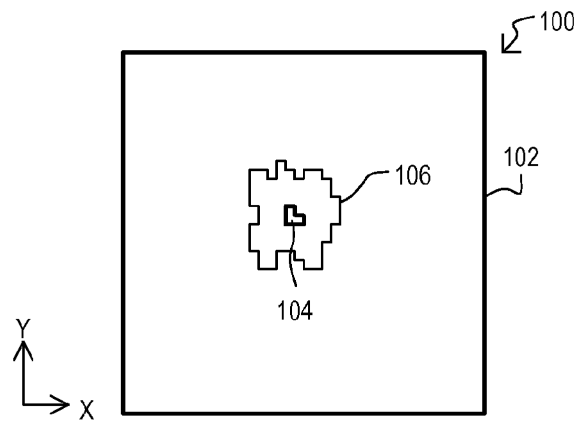
FIG. 1B
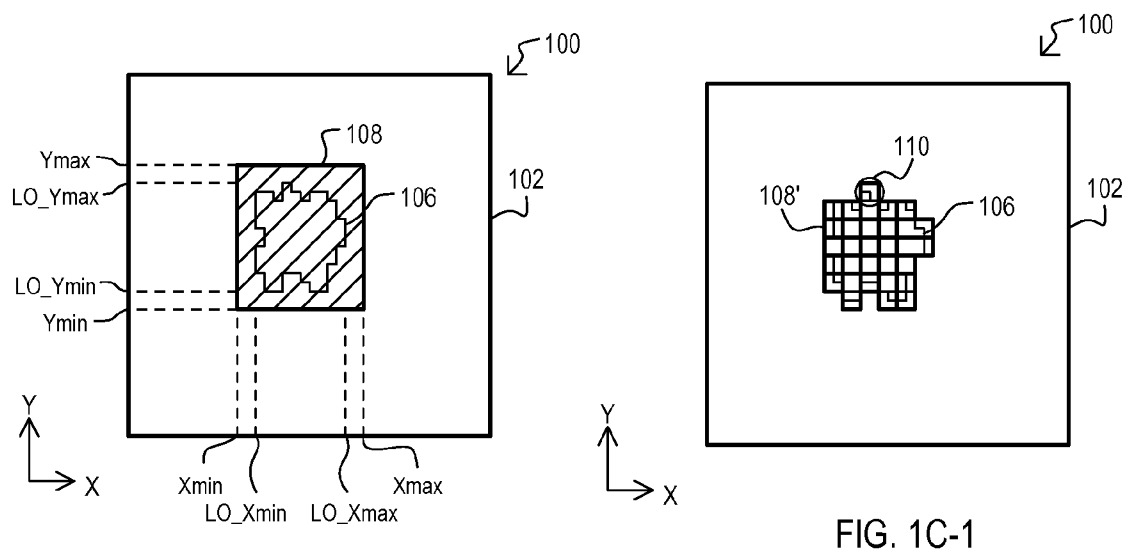
FIG. 1C-0
FIG. 1C-1

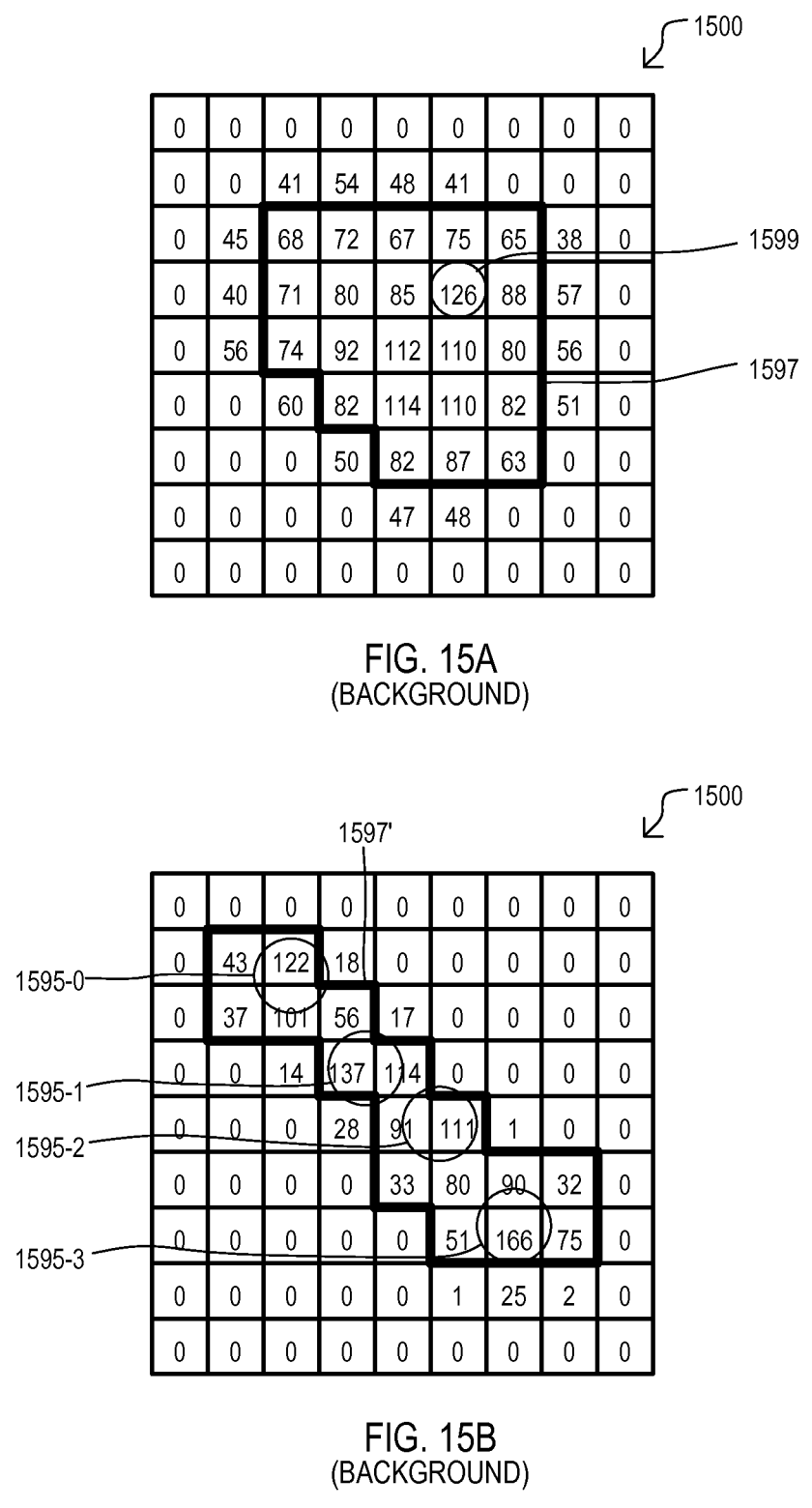

| 0 | 0 | 0 | 0 | 0 | 0 | 0 | 0 | 0 |
|---|---|---|---|---|---|---|---|---|
| 0 | 0 | 41 | 54 | 48 | 41 | 0 | 0 | 0 |
| 0 | 45 | 68 | 72 | 67 | 75 | 65 | 38 | 0 |
| 0 | 40 | 71 | 80 | 85 | 126 | 88 | 57 | 0 |
| 0 | 56 | 74 | 92 | 112 | 110 | 80 | 56 | 0 |
| 0 | 0 | 60 | 82 | 114 | 110 | 82 | 51 | 0 |
| 0 | 0 | 0 | 50 | 82 | 87 | 63 | 0 | 0 |
| 0 | 0 | 0 | 0 | 47 | 48 | 0 | 0 | 0 |
| 0 | 0 | 0 | 0 | 0 | 0 | 0 | 0 | 0 |

FIG. 15A
(BACKGROUND)

| 0 | 0 | 0 | 0 | 0 | 0 | 0 | 0 | 0 |
|---|---|---|---|---|---|---|---|---|
| 0 | 43 | 122 | 18 | 0 | 0 | 0 | 0 | 0 |
| 0 | 37 | 101 | 56 | 17 | 0 | 0 | 0 | 0 |
| 0 | 0 | 14 | 137 | 114 | 0 | 0 | 0 | 0 |
| 0 | 0 | 0 | 28 | 91 | 111 | 1 | 0 | 0 |
| 0 | 0 | 0 | 0 | 33 | 80 | 90 | 32 | 0 |
| 0 | 0 | 0 | 0 | 0 | 51 | 166 | 75 | 0 |
| 0 | 0 | 0 | 0 | 0 | 1 | 25 | 2 | 0 |
| 0 | 0 | 0 | 0 | 0 | 0 | 0 | 0 | 0 |

FIG. 15B
(BACKGROUND)

(BACKGROUND)

CIRCUITS, SYSTEMS, AND METHODS FOR PROCESSING THE PROXIMITY OF LARGE OBJECTS, INCLUDING LARGE OBJECTS ON TOUCH SCREENS

This application claims the benefit of U.S. provisional patent application Ser. No. 61/602,385 filed on Feb. 23, 2012, the contents of which are incorporated by reference herein.

TECHNICAL FIELD

The present disclosure relates generally to proximity sensing systems, including touch sensing systems, and more particularly to capacitance proximity/touch sensing systems and methods.

BACKGROUND

Many electronic devices, including cell phones and tablet computers, include a touch screen as an input device. A touch screen can include an array of sensors disposed over a display for detecting the proximity of objects (i.e., touches on the surface of the touch screen).

For some devices, in particular large sensor arrays, a desirable feature can be that of "large" object (LO) detection. LO detection can identify the proximity of objects over a certain size, and prevent such objects from triggering input events. For example, it can desirable to be able to rest ones palms or a drinking container (i.e., mug) on a surface of a touch screen without triggering an input event, while at the same time, still being able to control the device with finger touches.

FIG. 15A is a diagram showing conventional LO detection in a capacitance sensing system 1500. Conventional system 1500 can include an array of sensors, each of which can generate a count value corresponding to its capacitance. FIG. 15 shows count values for each position in a sensor array. Conventional LO detection can find a local maximum count value (126) 1599, and then find a contiguous region surrounding the local maximum that falls within a LO detection threshold. In the example shown, a LO detection threshold can be 50% of the local maximum, yielding a LO threshold region 1597 in the sensor array. If region 1597 exceeds an LO size minimum, the region can be considered an LO region. Touches within the LO region can then be ignored.

Conventional LO detection can provide adequate large object detection for flat, stationary objects. However, for large objects that move, have irregular surfaces, or change shape, conventional large object detection can generate erroneous inputs events.

Conventionally, detection of large objects having an irregular surface may be improved by lowering a threshold value. However, as shown in FIG. 15B, raising a threshold value can result in loss of sensitivity to small objects.

FIG. 15B is a diagram showing how lowering a threshold can result in false LO detection. In FIG. 15B, four small objects (e.g., fingers) can be in proximity to the sensor array at locations 1595-0 to 1595-3. An LO detection threshold has been lowered to 25% of the local maximum at 1595-0 (122), to detect irregular large objects. Consequently, the proximity of four separate "small" objects (1595-0 to 1595-3) can be misinterpreted as a large object region 1597'.

Conversely, the raising of a large object detection threshold can result the failure to detect a large object. This is shown in FIG. 15C.

FIG. 15C is a diagram showing how raising a threshold can result in the failure to detect a large object. In FIG. 15C, a large object can be in proximity to the sensor array in a "true" large object region 1597 (shown by a dashed line). However, an LO detection threshold has been raised to 75% of the local maximum at 1599 (74). As a result, an LO detection operation detects region 1593 (shown by a solid line), which can be smaller than an LO size threshold. Consequently, the proximity of the large object can erroneously sensed as valid input events.

As noted above, large objects that move can also present challenges to conventional LO sensing systems. A moving large object can move beyond its originally sensed region, and be misinterpreted as a touch event at the periphery of the previous large object location. This can be particularly, true if the large object moves in the same or opposite direction of a scanning of the sensors. Still further, other large objects (e.g., palms) may change shape slightly, or later pressure. In conventional LO sensing systems, such changes can also trigger false input events (e.g., false touches).

BRIEF DESCRIPTION OF THE DRAWINGS

FIGS. 1A to 1C-1 are diagrams showing proximity sensing systems and operations that form "ignore zones" around detected large objects according to an embodiment.

FIGS. 15A to 15C are diagrams showing a conventional proximity sensing system operations.

DETAILED DESCRIPTION

Figure 2A:
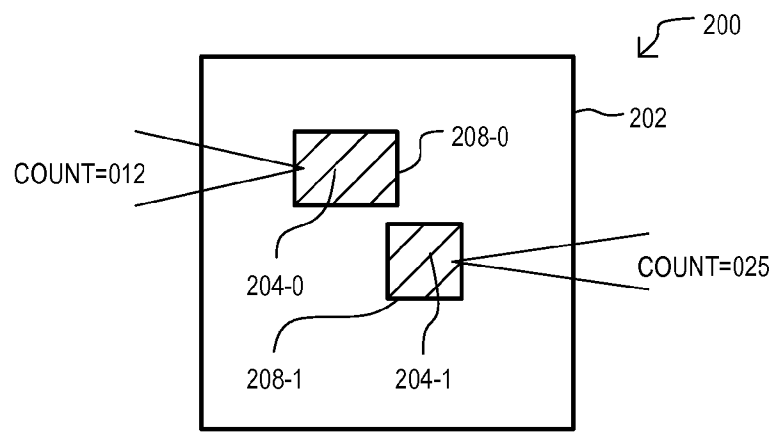
FIGS. 2A to 2C are diagrams showing proximity sensing systems and operations that form ignore zones around detected large objects, where such ignore zones have a limited duration, according to an embodiment.

Various embodiments will now be described that show object proximity sensing circuits, systems and methods that can generate "ignore" zones around detected large objects, where such ignore zones have a limited duration. Sense events occurring within ignore zones can be considered invalid sense events (e.g., are ignored). Variations in detected large objects (e.g., shape, movement) can remain captured within an ignore zone, and so may not trigger erroneous sense events (e.g., false touches).

In the various embodiments shown below, like items are referred to by the same reference character but with the first digit(s) corresponding to the figure number.

FIGS. 1A to 1C-1 show a proximity sensing system 100 and operations according to an embodiment. A system 100 can include a sensor array 102 formed from a number of sensors. In the embodiment shown, a sensor array 102 can be a two-dimensional array, having a sensing area that extends in X and Y directions. Sensors can take any suitable form. In particular embodiments, a sensor array 102 can be touch system that senses touches of one or more objects (e.g., fingers, styluses). Such sensing can be based on capacitance sensing or resistance sensing, as but two examples.

FIG. 1A shows an initial object detection of system 100. Sensors within sensor array 102 can be sensed (e.g., scanned) to determine if an object is in proximity to the sensor array 102. In one embodiment, sensor values can be compared to a sense threshold, and if the sense threshold is exceeded, an object can be determined to be in proximity to the sensor. FIG. 1A shows such an initial detection of an object at position(s) 104. Initial detection of an object can include any suitable method. In a very particular embodiment, an initial object detection can find local maximums (or minimums depending upon the sense technique). Further, such an operation can include various other actions, including filtering, averaging, or median calculations, as but a few of many possible examples.

FIG. 1B shows a large object (LO) detection by system 100. Sensor values in proximity to initial object position 104 can be compared to a large object threshold. In one embodiment, a system 100 can determine a region 106 that includes the initial object position 104 and any sensors with values above the large object threshold. If region 106 is larger than a LO threshold size, the region 106 can be determined to be a large object region. In the embodiment shown, it is assumed that region 106 is determined to be a large object region.

Figures 0, 11A:
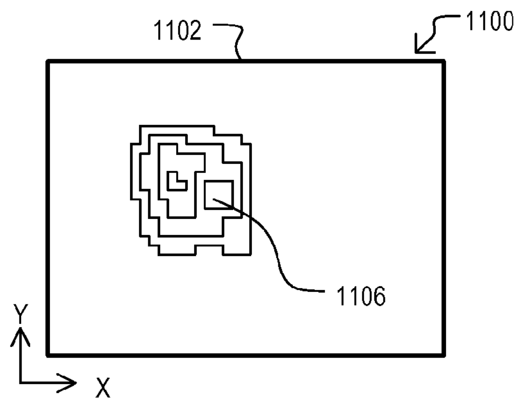
FIGS. 11A-0 to 11B-2 are diagrams showing proximity sensing systems and operations that can form three dimensional ignore zones around detected large objects according to an embodiment.
Figures 0, 11B:
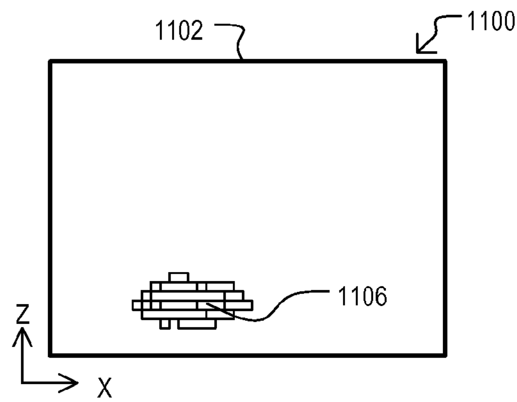

FIG. 1C-0 shows the formation of an ignore zone 108 according to one embodiment. An ignore zone 108 can be a region that includes a large object region 106, but in addition, has borders that extend beyond the large object region 106. Consequently, even if a large object moves, it may remain within the ignore zone 108.

In the very particular embodiment shown, an ignore zone 108 can be a rectangle defined by position values Ymax, Ymin, Xmax, Xmin. Further, Ymax can be LO_Ymax+BuffYp, where LO_Ymax can be a highest Y value amongst all sensors in the large object region, and BuffYp can be a buffer size that establishes how far ignore zone 108 extends beyond the large object region 106 in the +Y direction. Similarly, Xmax=LO_Xmax+BuffXp, where LO_Xmax can be a highest X value amongst all sensors in the large object region, and BuffXp can establish how far ignore zone 108 extends beyond the large object region 106 in the +X direction. The minimum values are derived in the same essential fashion, Ymin=LO_Ymin−BuffYn and Xmin=LO_Xmin−BuffXn, where LO_Ymin/LO_Xmin are minimum Y/X values in the large object region 106, and BuffYn and BuffXn establish how far ignore zone 108 extends in the −Y and −X directions, respectively. Any of buffer values BuffYp, BuffYn, BuffXp, BuffXn can be the same, or can be different from one another.

Sense events within ignore zone 108 can be designated as "invalid". As but one example, invalid sense events can be ignored by applications monitoring input events.

Figures 1, 11A:
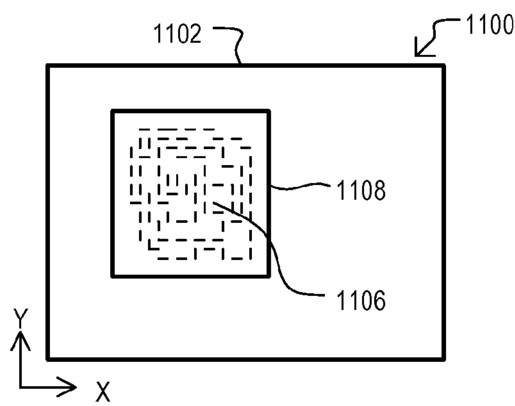
Figures 1, 11B:
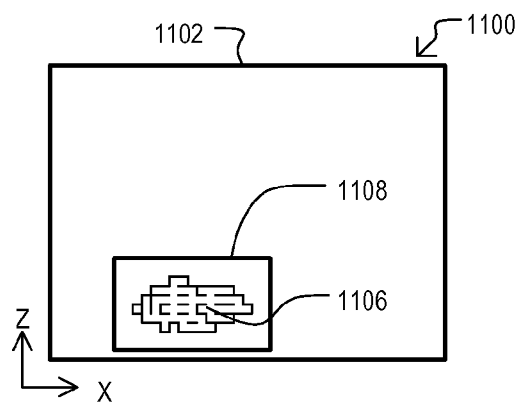

FIG. 1C-1 shows the formation of an ignore zone 108' according to another embodiment. In the embodiment of FIG. 1C-1, sensors in array 102 can be divided into groups of adjacent sensors. If a sensor within a group is part of the large object region, the entire group can be considered an ignore group (FIG. 1C-1 shows 31 groups, one circled as 110). Ignore sensor groups (e.g., 110) can collectively form ignore zone 108'. As in the case of FIG. 1C-0, sense events within ignore zone 108' can be designated as "invalid".

The embodiment of FIG. 1C-1 can generate an ignore zone 108' that follows the contours of the large object region 106 more precisely than rectangle approach, like that of FIG. 1C-0.

In this way, a proximity sensing system can designate ignore zones around sensed large objects, where such ignore zones include buffer areas that extend beyond the sensed large object area.

While embodiments of the invention can include methods and systems that form ignore zones with buffer areas around large object areas, embodiments can also include ignore zones with limited durations.

Figure 2B:
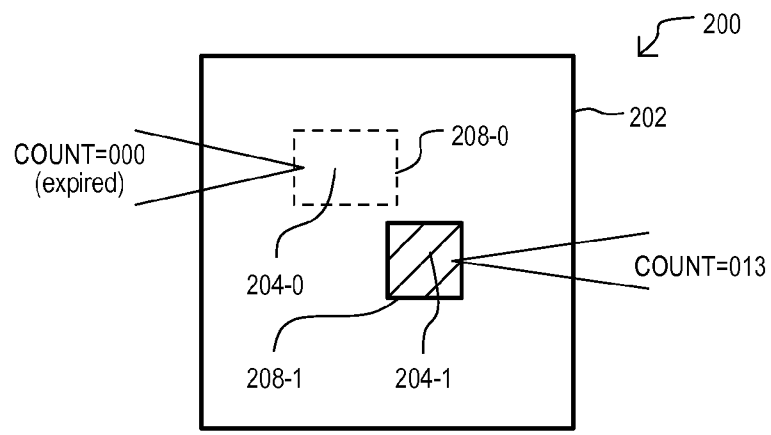
Figure 2C:
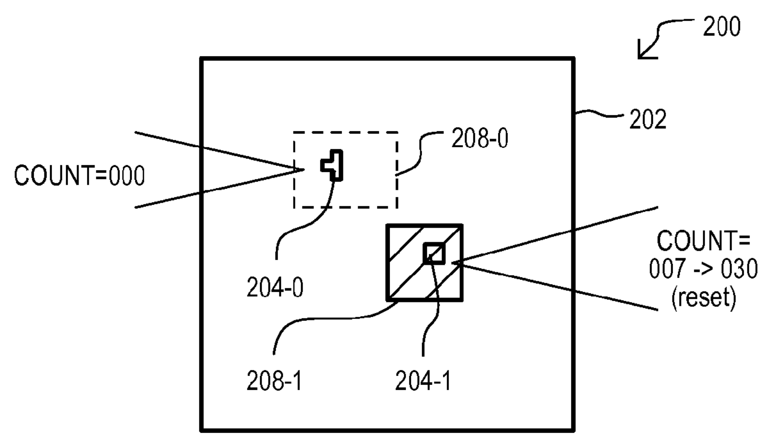

FIGS. 2A to 2C show a proximity sensing system 200 and operations according to another embodiment. A system 200 can create ignore regions with limited durations. Once an ignore region expires, touch events within such a region can be processed in a normal fashion. Further, in some embodiments, touch events within an active area can reset the duration of the ignore region.

In some embodiments, ignore regions can be ignore zones as described herein (i.e., zones with a buffer region around a large object region). However, in other embodiments ignore regions can be large object regions.

In the particular embodiment of FIGS. 2A to 2C, each ignore region 208-0/1 can be assigned a count value upon creation. The count value can be decremented as sense operations are performed. Once a count value reaches "0", the corresponding ignore region can expire.

Referring to FIG. 2A, it is assumed that a system 200 has defined two ignore regions 208-0/1. As noted above, such regions can be ignore zones, or can be large object regions. In FIG. 2A, ignore region 208-0 has a count value of "012", while ignore zone 208-1 has a count value of "025". It is understood that while regions 208-0/1 are shown to be rectangular, in other embodiments, they can have different shapes.

Referring to FIG. 2B, it is assumed that proximity detection operations have continued, resulting in a count value for ignore region 208-0 reaching zero (000). As a result, ignore region 208-0 is expired, and sense events within the region will be valid. In contrast, ignore region 208-1 has a count value 013, thus it remains an active ignore region.

Referring to FIG. 2C, a system 200 senses an object at position 204-0, which is in the now expired ignore region 208-0 (e.g., the sensor value exceeds a sense threshold). As a result, the action at position 204-0 can be processed in a standard fashion, which can include determining if it is a large object, and if it is not, generating a valid input event.

Referring still to FIG. 2C, a system 200 also senses an object at position 204-1, which is in the active ignore region 208-1. As a result, a duration of the ignore region 208-1 can be reset. That is, it can be set to a value larger than its current value. In the particular embodiment shown, a count for ignore region 208-1 can be reset from 007 to 030.

Having described systems and methods according to some embodiments, additional methods will now be described with reference to flow diagrams.

Figure 3:
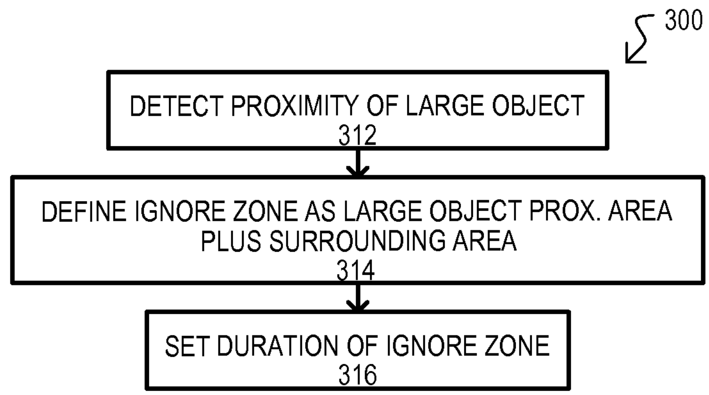
FIG. 3 is a flow diagram of a method according to an embodiment.

FIG. 3 shows a flow diagram of a method 300 according to an embodiment. A method 300 can include detecting the proximity of a large object (312). Such an action can include any of the large object detection methods described herein or equivalents. In one embodiment, box 312 can include actions like those shown in FIGS. 1A and 1B.

A method 300 can further include defining an ignore zone as a large object proximity area plus a surrounding area (314). In some embodiments, such an action can include identifying sensor locations for the large object area, and one or more sensor locations adjacent to the large object area. In particular embodiments, box 314 can include actions like those of FIGS. 1C-0 and/or 1C-1.

A method 300 can also include setting a duration of the ignore zone (316). A duration for an ignore zone can determine a lifetime of the ignore zone. In particular embodiments, while an ignore zone is active, sense events within the ignore zone can be considered invalid (e.g., do not trigger an input event).

Figure 4:
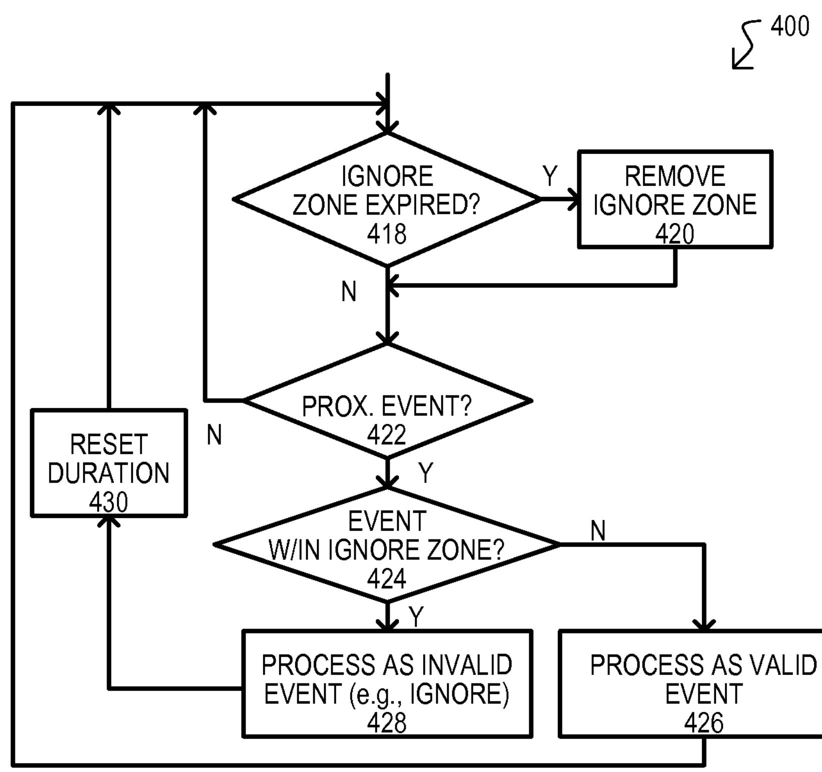
FIG. 4 is a flow diagram of a method according to another embodiment.

FIG. 4 shows a flow diagram of a method 400 according to another embodiment. A method 400 can include determining if any ignore zone has expired (418). In particular embodiments, such an action can include determining if a count for each ignore zone has reached a limit. If an ignore zone is expired (Y from 418) the ignore zone can be removed (420).

Once any expired ignore zones have been removed (N from 418), method 400 can check a sensor array from a proximity event (422). In particular embodiments, box 422 can include acquiring a sensor value, and comparing the sensor value to a sense threshold level. If no proximity event is detected (N from 422), a method 400 can return to a starting point of the method.

If a proximity event is detected (Y from 422), a method 400 can determine if the proximity event is within an ignore zone (424). In some embodiments, such an action can include comparing the position of the proximity event to position data for the ignore zone(s). If a proximity event is outside of any ignore zone (N from 424), a method 400 can process the event as a valid event 426. In particular embodiments, this can include providing position data corresponding to a sensor location of the proximity event.

If a proximity event is within an ignore zone (Y from 424), a method 400 can process the event as an invalid event 428. In particular embodiments, this can include ignoring the event. A method 400 can then reset a duration for the ignore zone 430. In particular embodiments, such an action can include resetting a count value for the ignore zone.

While embodiments can include various object proximity detection systems, particular embodiments can include touch detection systems, such as capacitance sensing systems incorporated into touch screens or the like. A particular embodiment for a touch system will now be described.

Figure 5:
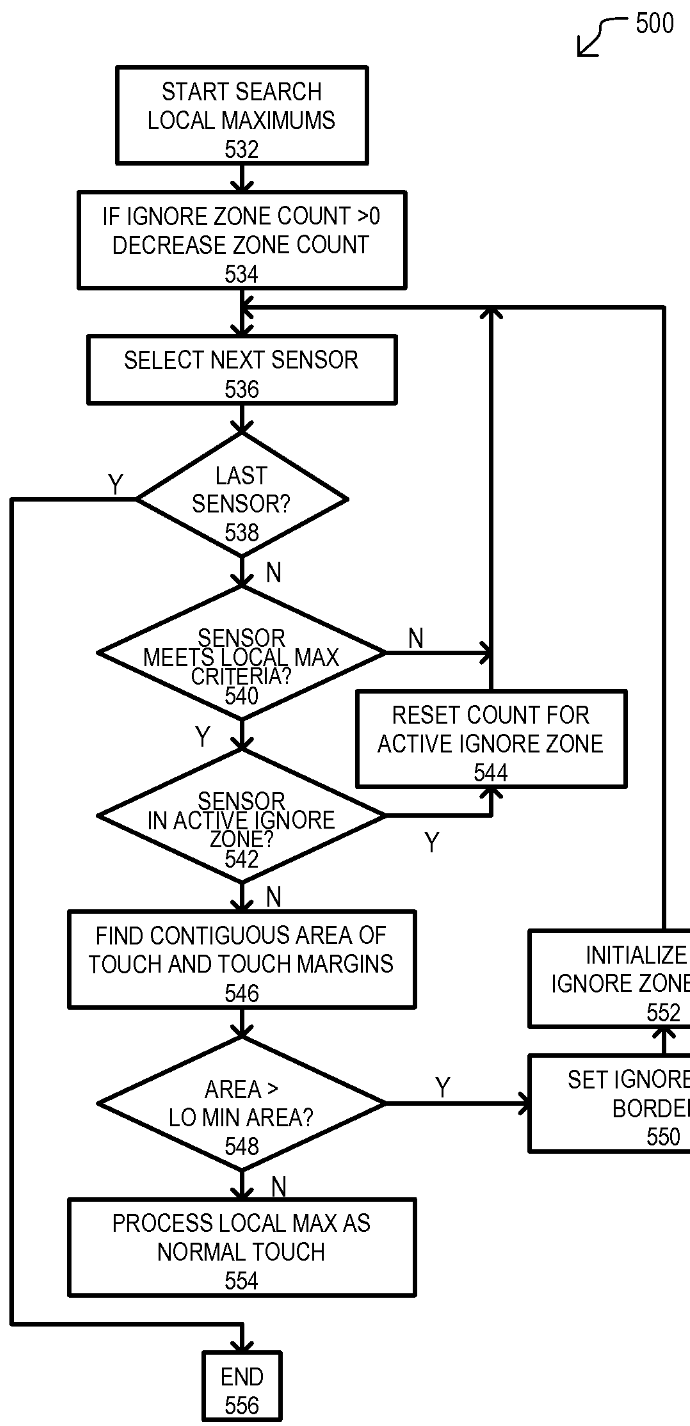
FIG. 5 is a flow diagram of a method according to a further embodiment.

FIG. 5 shows a flow diagram of a method 500 according to a further embodiment. A method 500 can include starting a search for local maximums (532). Such an action can include getting touch sense readings for all sensors in a capacitance sensor array. Such touch readings can be sense count values, where a larger sense count value indicates a closer proximity. As noted above, in some embodiments, a processing to find local maxima can include filtering and other additional algorithms.

A method 500 can also check for ignore zone counts, and if an ignore zone count is greater than 0, it can decrease the zone count (534). In this way, a local maxima search can decrement zone counts for active ignore zones.

A method 500 can cycle through each sensor in a system by selecting a next sensor in an array (536). Such steps can include checking if a last sensor has been selected (538). If a last sensor has not been selected (N from 538), for each sensor, a method 500 can determine if local maximum criteria have been met (540). If such criteria have not been met (N from 540), a next sensor can be selected (536). Once a last sensor is reached (Y from 538), a method 500 can end (556).

If a local maximum is found (Y from 540), the sensor can be checked to see if it is in an active ignore zone (542) (an active ignore zone having a count greater than 0). If the local maximum is in an active ignore zone (Y from 542), the duration count for the ignore zone can be reset (544).

Referring still to FIG. 5, if the local maximum is not in an ignore zone (N from 542), a method 500 can perform a large object detection operation. A contiguous area of touches and touch margins can be found (546). In very particular embodiments, areas of touches can correspond to sensors that meet local maximum criteria, and touch margins can be sensors having counts above a predetermined percentage of a local maximum (i.e., a large object threshold). If the contiguous area is greater than a large object minimum area (Y from 548), a large object can be determined to exist. In the embodiment shown, ignore zone borders can be established around the contiguous area (550). In particular embodiments, such an action can include any of the ignore zone creation approaches shown herein, or equivalents. A count value can be initialized for the ignore zone (552). A method 500 can then proceed to a next sensor (536).

If the contiguous area is not greater than a large object minimum area (N from 548), the detected maximum is determined to not correspond to a large object. The local maximum(s) can be processed as "normal" touches (554). In very particular embodiments, such an action can include generating location values for such local maximums.

Figure 6:
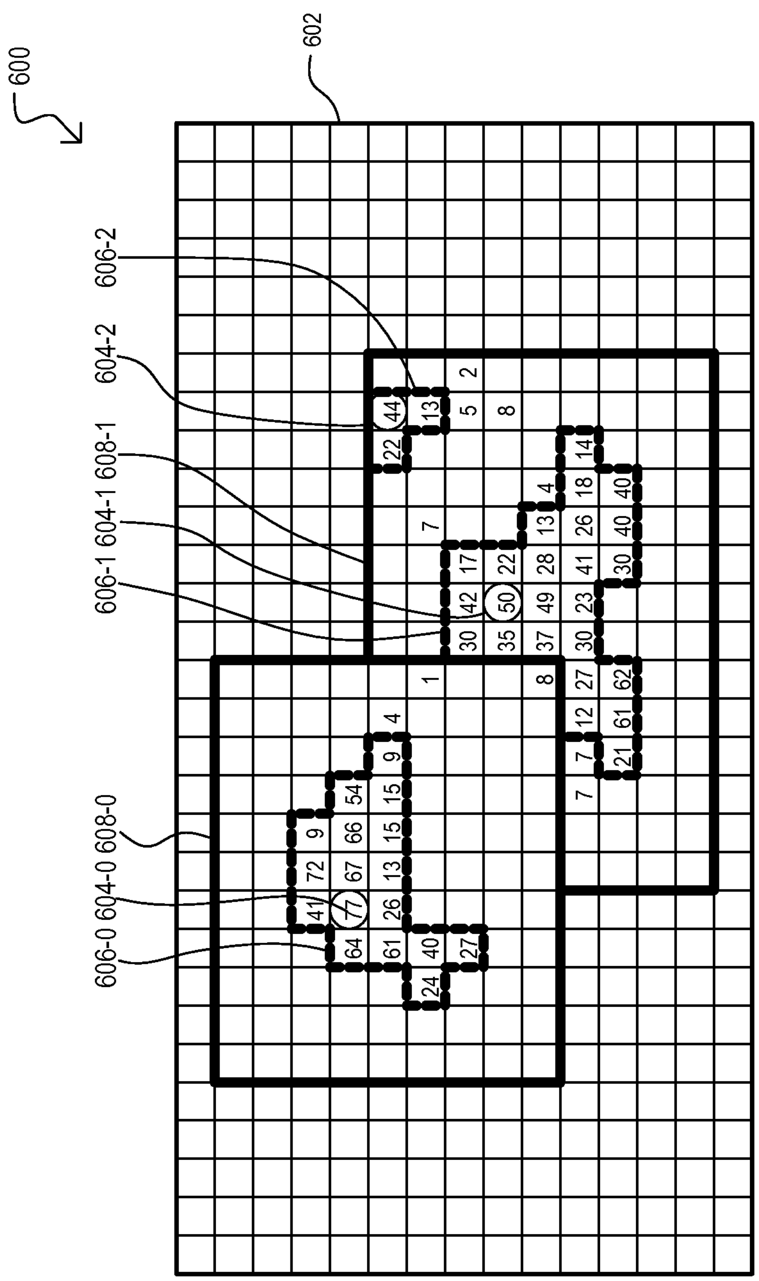
FIG. 6 is plan view of system according to another embodiment that can execute a method like that shown in FIG. 5.

FIG. 6 shows a system 600 according to an embodiment. In one particular embodiment, a system 600 can execute a method like that shown in FIG. 5. System 600 can detect finger sized touches. FIG. 5 shows results from a palm (which is a large object relative to finger touches) in contact with a touch sense array 602. System 600 can find local maximums 604-0/1/2. A first contiguous area 606-0 can be found in the area of local maximum 604-0, and a second contiguous area 606-1 can be found in the area of local maximum 604-1. A third, smaller, contiguous area 606-2 can be found around local maximum 604-2.

In the embodiment of FIG. 6, a system 600 can define an ignore zone as a two sensor buffer around largest X and Y values of a contiguous area. Accordingly, system 600 can define ignore zone 608-0 around contiguous area 606-0, and ignore zone 608-1 around contiguous area 606-1. It is noted that contiguous area 606-2 lies within ignore zone 608-1, and thus will not generate valid touch events.

As understood from the various embodiment described herein, the rectangular ignore zones of FIG. 6 represent but one approach to constructing ignore zones around a detected large object.

Figure 7:
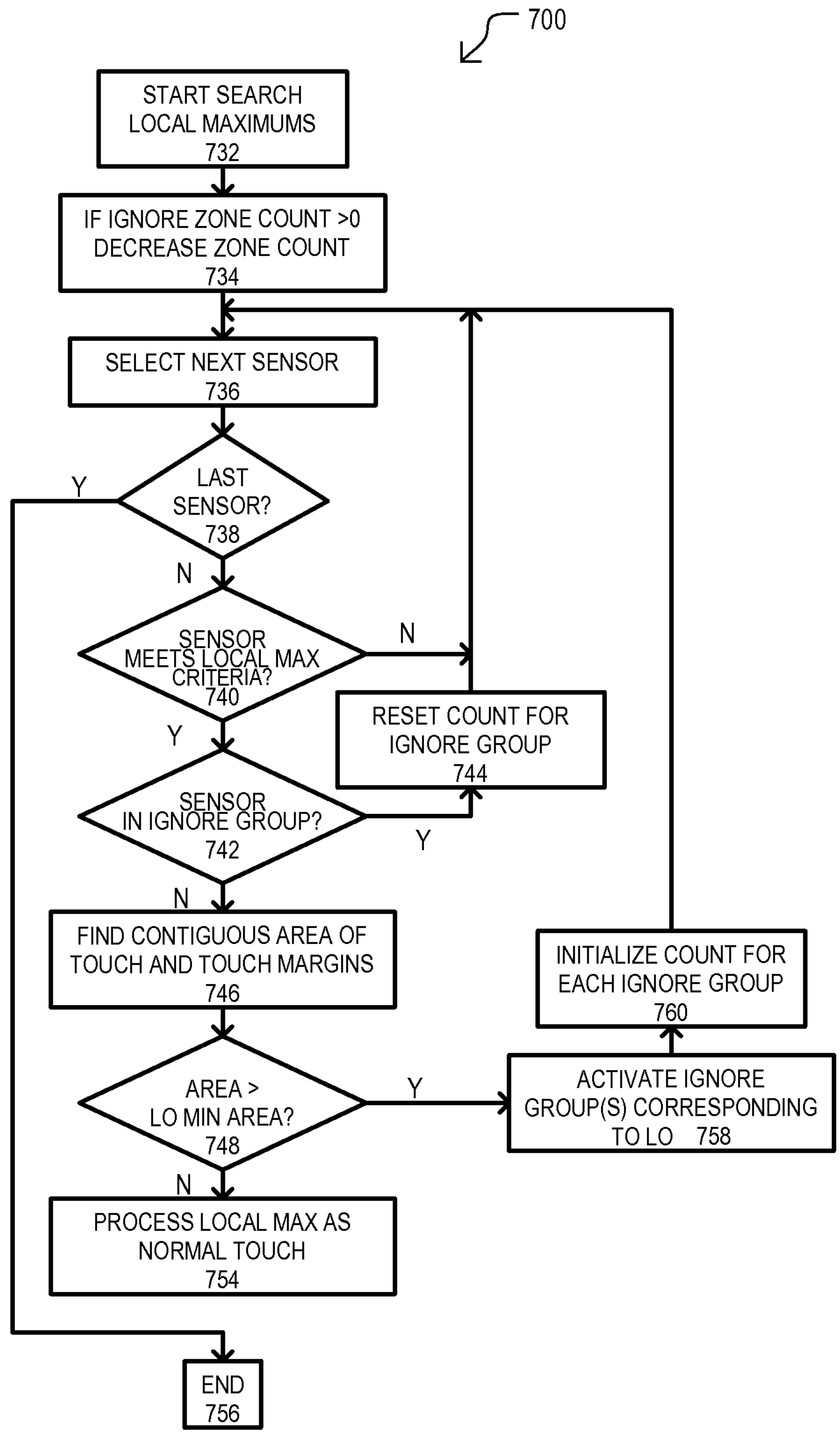
FIG. 7 is a flow diagram of a method according to a further embodiment.

FIG. 7 shows a flow diagram of a method 700 according to another embodiment. A method 700 can include sections like that of FIG. 5. However, in FIG. 7 a sensor array can have sensors arranged into groups, where the sensors of each group are contiguous with one another. A sensor group can be activated as an "ignore group". Touches within an active ignore groups can be processed differently (e.g., can be ignored) as compared to touches in other sensor groups. FIG. 7 can be one very particular implementation of operations executed by the system shown in FIG. 1C-1. Thus, in the embodiment of FIG. 7, it is understood that an ignore zone can be constructed of multiple ignore sensor groups.

Unlike FIG. 5, a method 700 can check for ignore group counts, and if an ignore group count is greater than 0, it can decrease the group count (734). Thus, unlike FIG. 5, in which an ignore zone can is activated and then expires as a single entity, in the embodiment of FIG. 7, it is possible that some ignore sensor groups within an ignore zone may expire before others.

As in the embodiment of FIG. 5, a method 700 can cycle through each sensor in a system to find any sensors that meet local maximum criteria (736, 738, 740). However, unlike FIG. 5, if a local maximum is found (Y from 740), a method 700 can determine if such a local maximum occurs in any active ignore sensor group (742). If the local maximum is in an ignore group (Y from 742), the duration count for the ignore group can be reset (744). In this way, over time, ignore groups can track a large object that may move, or change its shape within a sensor array area.

As in the case of FIG. 5, if a local maximum is not in an ignore zone (N from 742), a method 700 can perform a large object detection operation (746, 748).

Unlike the embodiment of FIG. 5, in FIG. 7 if a large object is detected (Y from 748), a method 700 can activate ignore groups corresponding to the sensed large object (758). A count value can be initialized for each ignore group (760). It is understood that ignore groups can be established with any suitable method. In a very particular embodiment, ignore groups can be tracked with a bit map, where each bit corresponds to a sensor group. Further, a count value for each group can be assigned, and then decremented and sense operations continue.

Figure 8A:
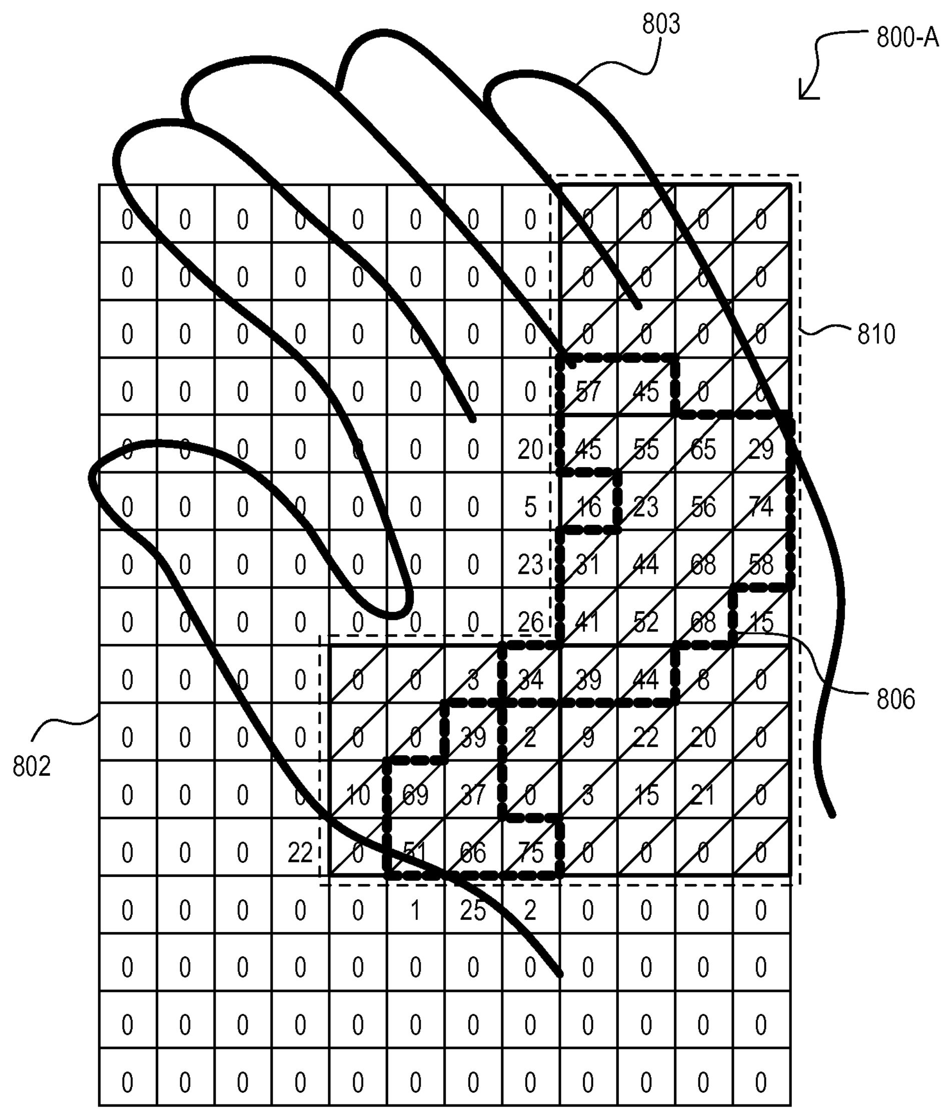
FIGS. 8A and 8B are plan views of systems according to other embodiments that can execute a method like that shown in FIG. 7.
Figure 8B:
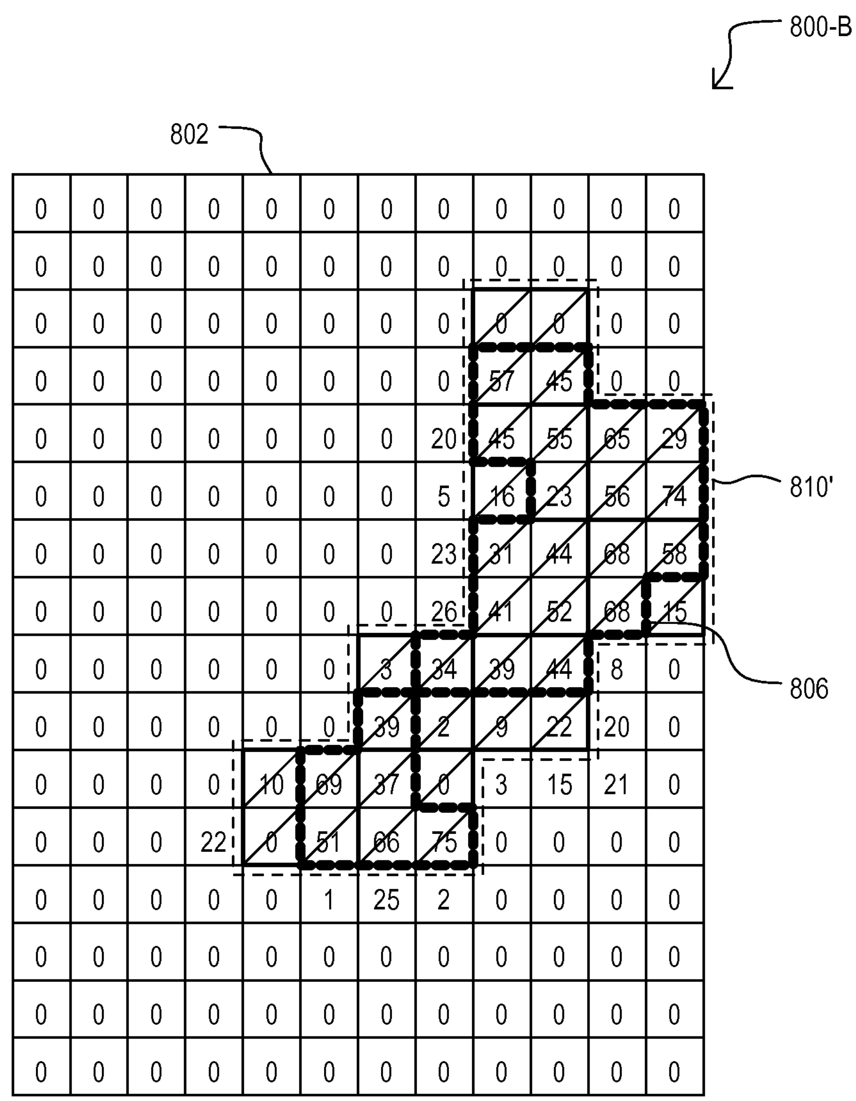

FIGS. 8A and 8B show systems 800-A/B according to additional embodiments. In very particular embodiments, systems 800-A/B can execute a method like that shown in FIG. 7. FIGS. 8A and 8B shows results from a large object in contact with a touch sense array 802.

FIG. 8A show a sensor array 802 divided into sensor groups, where each sensor group is composed of 16 sensors in a 4×4 array. In the embodiment shown, it is assumed that a large object (shown as 803) rests on a touch surface. As shown, a large object 803 can be part of the palm of a hand resting on a surface, while the fingers are not in contact with the surface. The particular object shape and response shown in FIG. 8A is provided by way of example. As understood from above, other objects can be detected.

In the particular embodiment shown, it is assumed that a large object margin limit is greater than 26, and forms a large object area 806 (shown by dashed line). Large object area 806 extends into four ignore groups (identified by diagonal hashing). Thus, such four sensor groups can form an ignore zone 810 around large object area 806.

FIG. 8B show a system like that of FIG. 8A, however, a sensor array 802 divided into sensor groups composed of 4 sensors in a 2×2 array. FIG. 8B shows the presence of the same large object as FIG. 8A. Large object area 806 extend into nine ignore groups (identified by diagonal hashing). Thus, such nine sensor groups can form an ignore zone 810' around large object area 806.

Figure 9A:
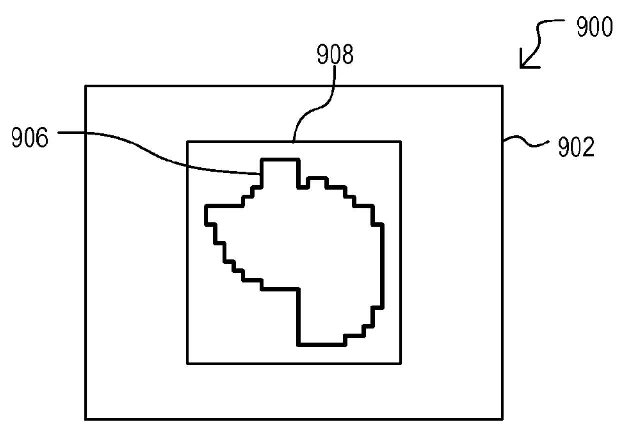
FIGS. 9A to 9C are a series of views showing sense operations according to an embodiment that can accommodate movement and changes in size of a large object area without triggering a false input event.
Figure 9B:
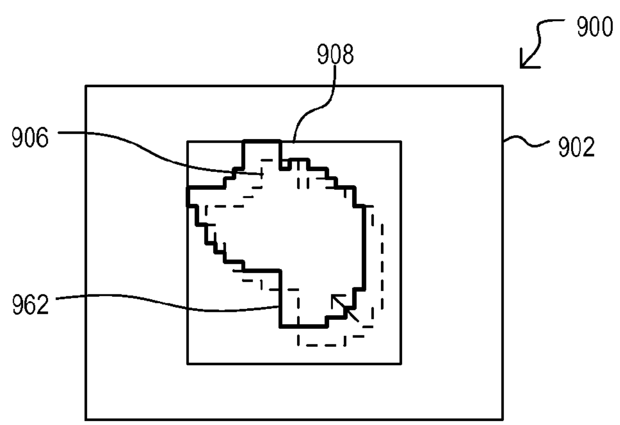
Figure 9C:
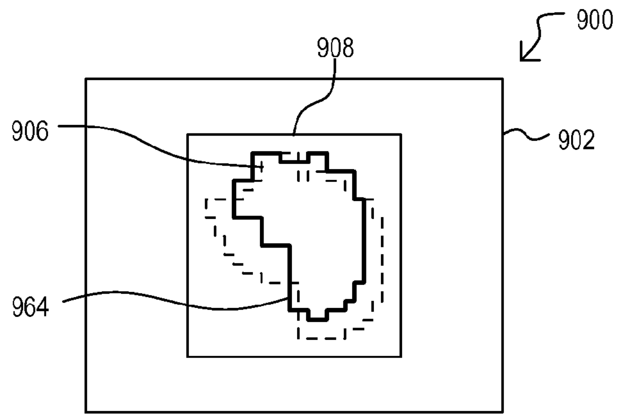

Referring now to FIGS. 9A to 9C, sense operations of a system 900, according to embodiments, are shown in a series of views.

FIG. 9A shows a system 900 that can form rectangular ignore zones according to embodiments herein, or equivalents. FIG. 9A shows a sensor array 902 that detects a large object (LO) position 906 as a group of sensors exceeding a large object threshold. From LO position 906 data, system 900 can define an ignore zone 908 that includes the large object, and in addition, a surrounding area of additional sensors.

FIG. 9B shows how an ignore zone 908 can compensate for movement in a large object. FIG. 9B shows a moved large object position 962 relative to the detected LO position 906. It is understood that the moved large object position 962 may not be detected by system 900, as it remains inside the ignore zone 908. However, the moved large object position 962 is included to show how a system 900 can remain immune to errors arising from such changes in LO position. The response of FIG. 9B is in contrast to conventional approaches, where such a movement in a large object can trigger false input events.

FIG. 9C shows how an ignore zone 908 can compensate for changes in large object size. FIG. 9C shows changed large object 964 relative to the detected LO position 906. As in the case of FIG. 9B, a changed large object 964 need not be detected by system 900, as it remains inside the ignore zone 908. However, in a conventional arrangement, that may seek to detect and define the large object with each sensor scan, such a change in size can trigger false input events.

In this way, by defining an ignore zone around a large object position that has a duration, movements and/or changes in size of the large object may not trigger false input events.

Figure 10A:
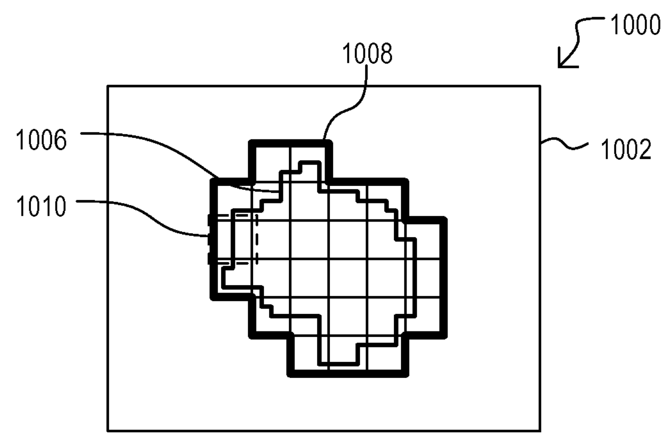
FIGS. 10A to 10C are a series of views showing sense operations according to another embodiment that can accommodate changes in size of a large object area without triggering a false input event.
Figure 10B:
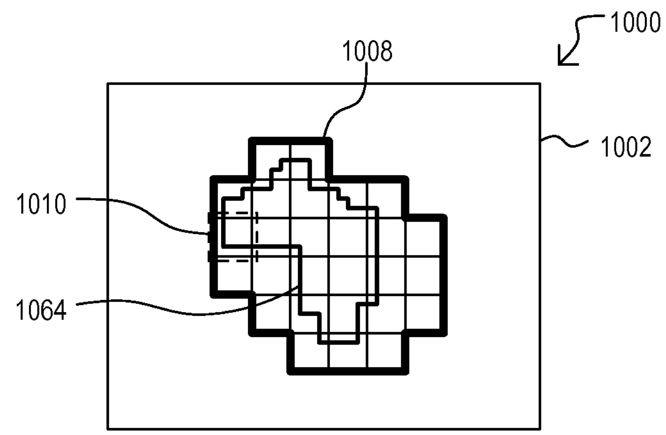
Figure 10C:
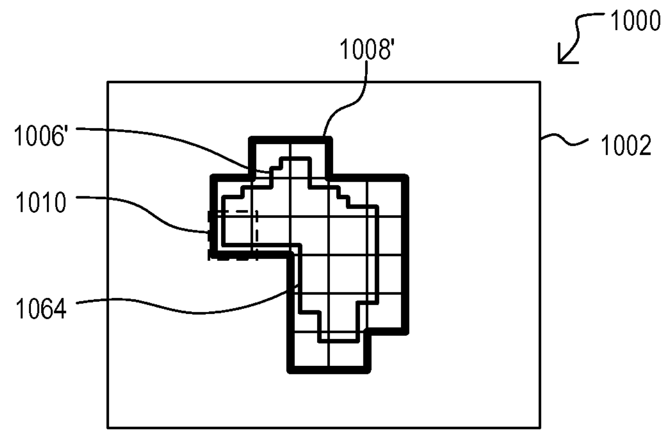

Referring now to FIGS. 10A to 10C, another system 1000 is shown in a series of views showing sensing operations according to embodiments.

FIG. 10A show a system 1000 that can form an ignore zone 1008 from multiple sensor groups (one sensor group shown as 1010). FIG. 10A shows a sensor array 1002 that detects a large object (LO) position 1006 as a group of sensors exceeding a large object threshold. From LO position 1006 system 1000 can define an ignore zone 1008 composed of sensor groups (e.g., 1010), where each sensor group includes a portion of the LO position 1006. It is understood that each sensor group can have a limited duration, which can be reset in the event a touch is detected within the sensor group.

FIG. 10B shows a change in a large object size. FIG. 10B shows a changed large object size 1064. It is understood that such a change in size may not be detected by system 1000, but is shown for purposes of illustration. Due to the changed large object position 1064, some sensor groups no longer include any portion of the large object position. It is understood that those sensor groups that include the changed large object size 1064 can have their duration reset. However, those sensor groups that do not include the changed large object size 1064 will not have their durations reset.

FIG. 10C shows how an ignore zone 1008 can compensate for changes in large object size. FIG. 10C shows how those sensor groups that do not include the changed large object size 1064 can expire, while those that include the changed large object position 1064 can remain active. As a result, an ignore zone 1008 can more closely follow the shape of the changed large object size, freeing other sensors to detect valid (e.g., not large object) input events.

While embodiments can include systems aimed at two-dimensional position sensing, alternate embodiments can include three dimensional sensing. Very particular examples of such embodiments will now be described.

FIGS. 11A-0 to 11B-2 show a proximity sensing system 1100 and operations according to a further embodiment. A system 1100 can include a sensor array 1102 formed from a number of sensors. In the embodiment shown, a sensor array 1102 can be a three-dimensional array that can sense object positions in a sense volume. FIGS. 11A-0,1,2 show a sense area extending in X and Y directions. FIGS. 11B-0,1,2 show a sense area extending in X and Z directions. Sensors can take any suitable form, and in particular embodiments, can include capacitance sensors.

FIGS. 11A-0/11B-0 show a large object (LO) detection by system 1100. Sensor values can be compared to a large object threshold. In one embodiment, a system 1100 can determine a region 1106 with values above the large object threshold. If a region 1106 is larger than a LO threshold size, the region 1106 can be determined to be a large object region. In the embodiment shown, it is assumed that region 1106 is determined to be a large object region.

FIGS. 11A-1/11B-1 show the formation of an ignore zone 1108 according to one embodiment. An ignore zone 1108 can be a region that includes a large object region 1106, but in addition, has borders that extend beyond the large object region 1106. Consequently, even if a large object moves, it may remain within the ignore zone 1108. In the very particular embodiment shown, an ignore zone 1108 can be a hexahedron defined by eight position values in space.

Sense events within ignore zone 1108 can be designated as "invalid". As but one example, invalid sense events can be ignored.

Figures 2, 11A:
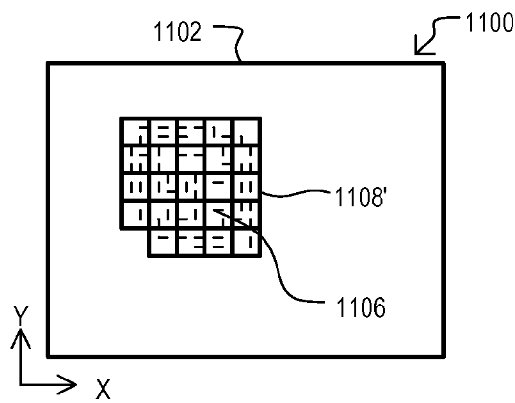
Figures 2, 11B:
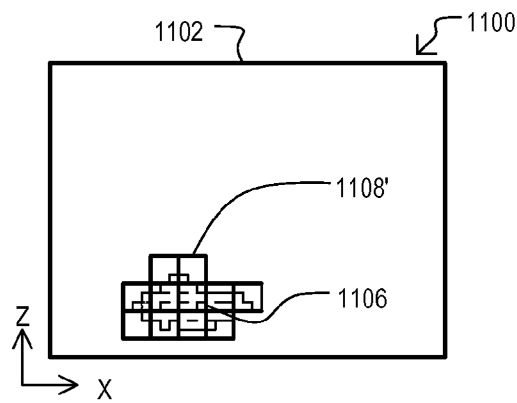

FIG. 11A-2/11B-2 show the formation of an ignore zone 1108' according to another embodiment. In the embodiment of FIGS. 11A-2/11B-2, sensors in array 1102 can be divided into three-dimensional groups of adjacent sensors. If a sensor within a group is part of the large object region, the entire group can be considered an ignore group. As in the case of FIG. 1C-0, sense events within ignore zone 1108' can be designated as "invalid".

Figure 12:
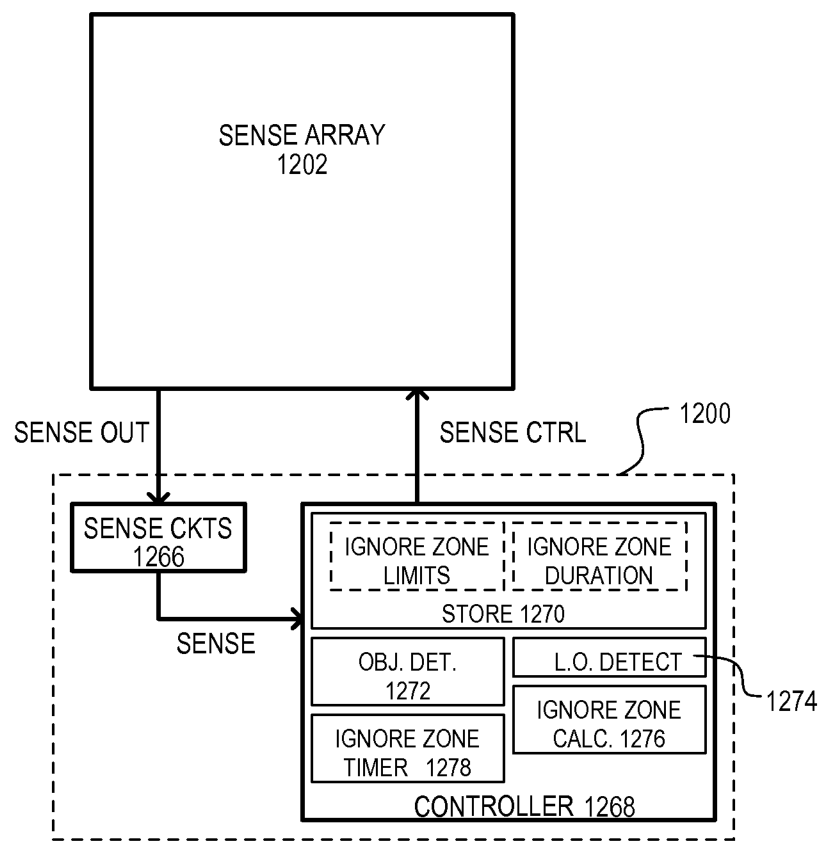
FIG. 12 is a block schematic diagram of a proximity sensing system according to an embodiment.

Referring now to FIG. 12, a system 1200 according to another embodiment is shown in a block schematic diagram. A system 1200 can include sense circuits 1266 and a controller circuit 1268. A system 1200 can be connected to a sensor array 1202.

Sense circuits 1266 can receive sensor readings (SENSE OUT) from sensors within sensor array 1202, and provide sense values (SENSE) to controller circuit 1268.

A controller circuit 1268 can provide sensor control signals (SENSE CTRL) to sensor array 1202 to control sensing operations therein. In response to sense values from sense circuits 1266, controller circuit 1268 can determine the existence of input events to sense array (e.g., detect the proximity of valid objects). In the embodiment shown, a controller circuit 1268 can include a controller store 1270, an object detector 1272, a large object (LO) detector 1274, an ignore zone calculator 1276, and an ignore zone timer 1278.

A controller store 1270 can store values for establishing ignore zones within a sensor array 1202. In the embodiment shown, a controller store 1270 can store ignore zone limits (IGNORE ZONE LIMITS) as well as ignore zone durations (IGNORE ZONE DURATION). Such values can be used by other sections of controller circuit 1268 in sensing operations.

Object detector 1272 can receive sense values (SENSE), and from such values determine whether objects are in proximity to sensor array 1202. In one embodiment, an object detector 1272 can include circuits for comparing received sense values to one or more thresholds. An object detector 1272 can detect the proximity of an object according to any of the embodiments shown herein, or equivalents.

Large object detector 1274 can distinguish between sizes of objects detected by object detector 1272. In particular embodiments, a large object detector 1272 can compare sensor readings for an area proximate to a detected object, and compare such values to a large object threshold value. A large object detector 1272 can detect a large object according to any of the embodiments shown herein, or equivalents.

An ignore zone calculator 1276 can define an ignore zone that includes the area corresponding to a detected large object. In some embodiments, an ignore zone can include a predetermined amount of sensors beyond the large object area. An ignore zone calculator 1276 can define ignore zones according to any of the embodiment shown herein, or equivalents.

An ignore zone timer 1278 can control a lifetime of any ignore zones. In some embodiments, an ignore zone timer 1278 can time each ignore zone according to one timing value (e.g., a count). In addition, or alternatively, an ignore zone timer 1278 can time different sensor groups that make up an ignore zone. Further, in some embodiments, an ignore zone timer 1278 can reset a duration of an ignore zone (or portion thereof) when a touch is detected in the ignore zone (or portion thereof).

A controller circuit 1268, or portions of the controller circuit, can be realized with any suitable circuits. In some embodiments, a controller circuit 1268 can include a processor executing predetermined instructions. However, in other embodiments, all or portions of controller circuit can be realized with logic, including but not limited to programmable logic.

Figure 13:
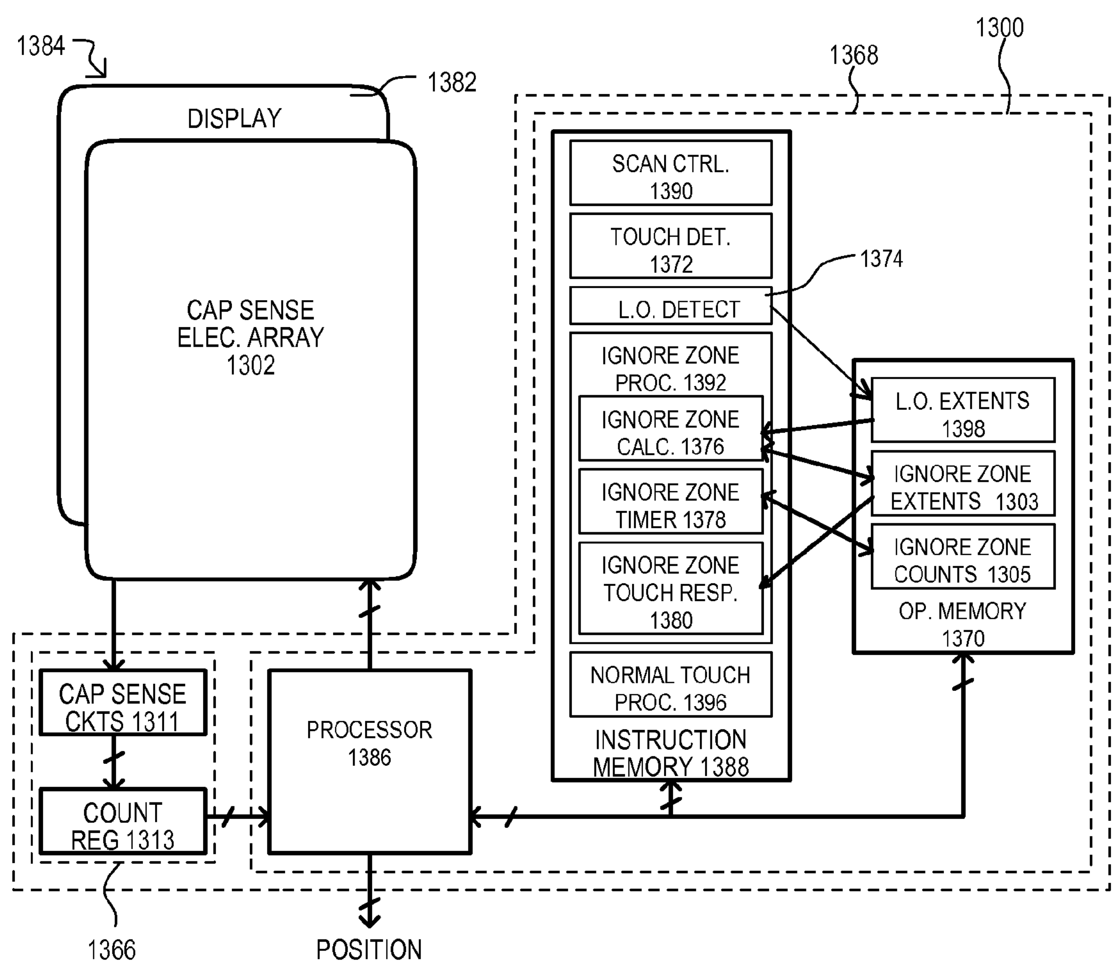
FIG. 13 is a block schematic diagram of a capacitance sensing system that can include a touch screen according to an embodiment.
Figure 14A:
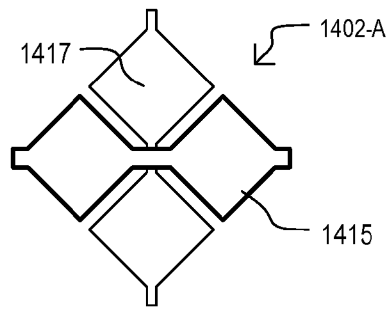
FIGS. 14A to 14E are top plan views of sensors that can be included in embodiments.
Figure 14B:
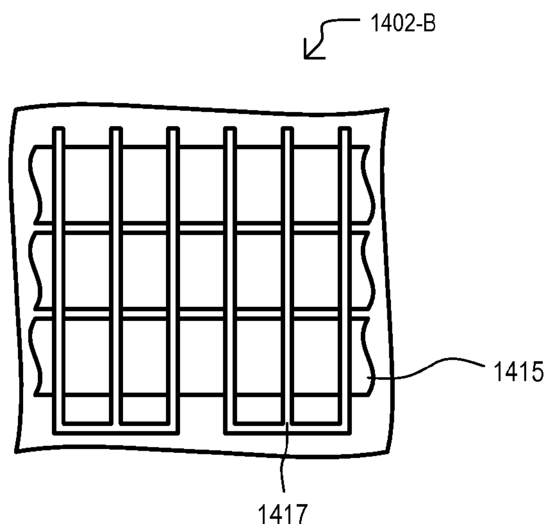
Figure 14C:
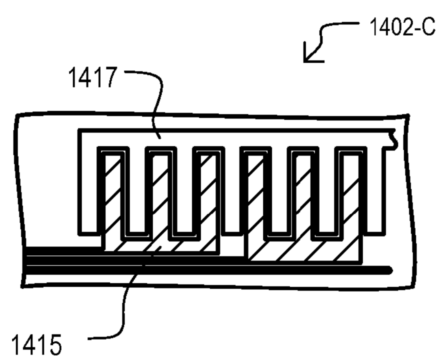
Figure 14D:
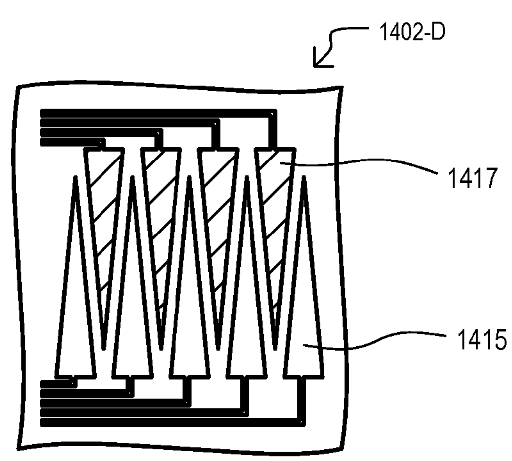
Figure 14E:
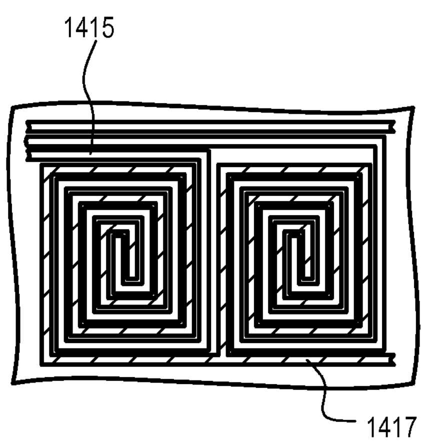
Figure 15C:
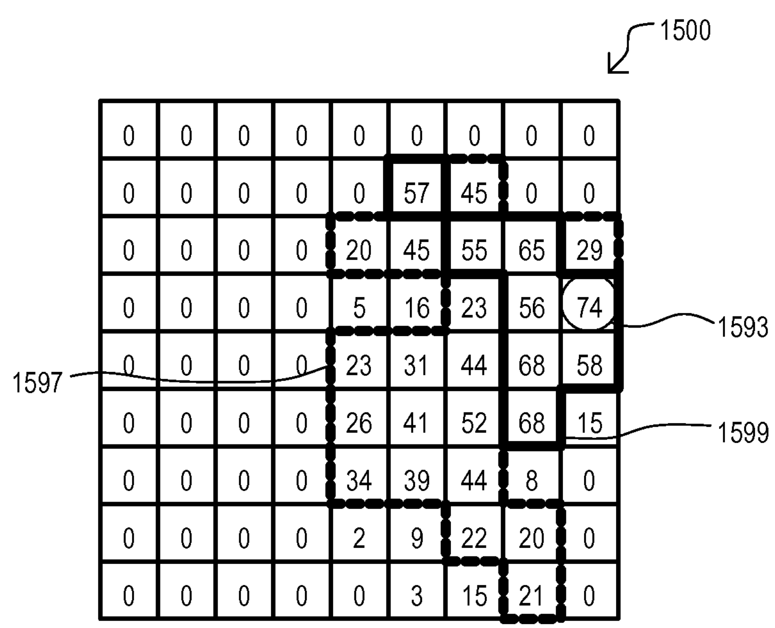

Referring now to FIG. 13, a system 1300 according to another embodiment is shown in a block schematic diagram. A system 1300 can include sense circuits 1366 and a controller circuit 1368. In the particular embodiment shown, a system 1300 can be connected to a capacitance sense touch screen 1380.

Sense circuits 1366 can include a capacitance sensing circuit 1311 and count registers 1313. A capacitance sensing circuit 1311 can detect a capacitance of one or more sensors of touch screen 1380. Capacitance sensing circuit 1311 can be any suitable capacitance measuring circuit, including but not limited to a sigma delta modulator, successive approximation circuit, or an integrating analog-to-digital converter type circuit. Count registers 1313 can store values (sense counts) that reflect a detected capacitance of a sensor. Such a value can vary according to the proximity of sensed objects.

A controller circuit 1368 can include a processor 1386, an instruction memory 1388 and an operational memory 1370. A processor 1386 can execute instructions within instruction memory 1388 to process sense results according to any of the embodiments herein, or equivalents. In response to sensed touch events, a processor 1386 can generate position information (POSITION) corresponding to a valid touch event. Such position information can be utilized for other applications (not shown).

In the very particular embodiment shown, instruction memory 1388 can include a scan controller 1390, touch detector 1372, large object detector 1374, ignore zone processor 1392, and normal touch processor 1396. A scan controller 1390 can be instructions that configure the processor 1386 to sequentially read sensors values (scan the sensors). A touch detector 1372 can include instructions that configure the processor 1386 to detect touches on touch screen 1380. In particular embodiments, a touch detector 1372 can compare count values in count registers 1313 to one or more thresholds. It is understood that such an action can include filtering count values, or other processing, prior to comparing a count value to a threshold.

A large object detector 1372 can include instructions that configure the processor to detect if an object touching touch screen 1308 is a large object. Such large object detection can include any of those methods shown in the embodiments herein, or equivalents. A large object detector 1372 can result in the generation of L.O. extents information 1303 being stored within operational memory 1370. Such information can define the location of a detected large object by sensor position. In some embodiments, L.O. extents information 1303 can identify each sensor determined to correspond to the large object. However, in other embodiments, such information can define a rectangle that includes the large object.

An ignore zone routine 1392 can include instructions that configure processor 1386 to generate ignore zones in response to detected large objects, and remove such ignore zones as they expire. In the particular embodiment shown, an ignore zone routine 1392 can include an ignore zone calculator 1376, an ignore zone timer 1378, and an ignore zone touch response 1380.

An ignore zone calculator 1376 can define the location for an ignore zone that surrounds a detected large object according to L.O. extents information 1303. An ignore zone calculator 1376 can define an ignore zone according to any the techniques shown herein, or equivalents, including a rectangle that surrounds a large object position and/or sensor groups that include a portion of the large object position. In addition, an ignore zone calculator 1376 can generate ignore zone count values that establish the duration (lifetime) of an ignore zone (or in some embodiments the duration of different sensor groups making up the ignore zone). In the embodiment shown, ignore zone count values 1305 can be stored in operational memory 1370.

An ignore zone touch response 1380 can process touch events with regard to existing ignore zones. Such processing can occur according to any of the embodiments herein, or equivalents. As but two examples, if a touch occurs in an existing ignore zone, the touch can be processed as a non-input event (i.e., it can be ignored). Further, a touch occurring in an ignore zone can result in the duration count for the ignore zone being reset. Of course, other embodiments can include other actions in response to detecting a touch within an ignore zone.

A normal touch processor 1396 can configure a processor to process touches that do not occur in an ignore zone. In a very particular embodiment, a normal touch processor 1396 can result in the generation of position information (POSITION) in response to such a touch event.

In some embodiments, instructions within instruction memory 1388 can configure processor 1386 to perform any of the methods shown in FIGS. 3, 4, 5, 7, or equivalents.

A touch screen 1384 can include a capacitance sense array assembly 1302 formed over a display 1382. A capacitance sense array 1302 can include electrodes arranged in two dimensions to create two dimensional detection area. In some embodiments, a controller circuit 1368 can have a direct connection to sensors groups within capacitance sense array 1302. However, in other embodiments, a capacitance sense array 1302 can include decoders for accessing groups of sensors.

In some embodiments, a system 1300 can be formed as a single integrated circuit device, including a programmed microcontroller that includes controller circuits 1368 and sense circuits 1366. In a very particular embodiment, a system 1300 can be implemented on a PSoC® programmable system-on-chip manufactured by Cypress Semiconductor Corporation of San Jose, Calif.

As noted above, embodiments of the invention can be utilized with various types of sensor arrays. However, particular embodiments can include capacitance sensing. FIGS. 14A to 14E are top plan views showing portions of capacitance sensing arrays 1402-A to 1402-E that can be included in embodiments. In the various embodiments shown, each array (1402-A to 1402-E) can include two different electrode (sensor) types 1415 and 1417. It is understood that FIGS. 14A to 14E show but a few examples of possible sensor arrangements that can be included in embodiments.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method of sensing at least one object in proximity to an array of sensors, comprising:

making a determination that an object greater than a predetermined size has been detected, wherein the predetermined size is large relative to a finger touch;

defining an ignore zone relative to the object that includes first sensor locations of the object and second sensor locations surrounding a least a portion of the first sensor locations, wherein defining the ignore zone includes determining that a sense value of at least one of the second sensor locations meets or exceeds a threshold sense value of the ignore zone, wherein the threshold sense value of the ignore zone is less than a first sense threshold associated with the first sensor locations; and removing the ignore zone after a predetermined duration, wherein determination of proximity of other objects outside of the ignore zone is processed differently than determination of proximity of objects inside of the ignore zone.

2. The method of claim 1, wherein:

making a determination that an object greater than a predetermined size has been detected includes if a sense value at any location of the array exceeds the first sense threshold, defining the location as a primary sense location, if sense values for locations surrounding the primary sense location exceed a second sense threshold, wherein the second sense threshold is less than the first sense threshold, defining such locations as secondary sense locations, and if the primary and secondary sense locations exceed the predetermined size, defining the primary and second sense locations as the locations of the object.

3. The method of claim 1, wherein:

making a determination that an object greater than a predetermined size has been detected includes generating capacitance sense values for each location of the array.

4. The method of claim 1, wherein:

making a determination that an object greater than a predetermined size has been detected includes detecting an object on a touch surface.

5. The method of claim 1, wherein:

defining the ignore zone includes defining at least a first rectangle that includes and extends beyond first sensor locations of the object.

6. The method of claim 1, wherein:

the array of sensors includes contiguous groups of sensors; and the ignore zone includes each group of sensors having at least one sensor corresponding to the object.

7. The method of claim 1, further including:

resetting the duration of the ignore zone if the proximity of an object is detected within the ignore zone.

8. The method of claim 1, further including:

generating position data corresponding to third sensor locations that detect the proximity of an object outside of the ignore zone; and ignoring sensor readings corresponding to first and second sensor locations that detect the proximity of an object inside of the ignore zone.

9. A method, comprising:

defining an ignore zone of a sensor array by including in the ignore zone first sensor locations corresponding to a detected object and second sensor locations that are adjacent to at least a portion of the first sensor locations and have sensor readings that meet or exceed a first sense threshold associated with defining the ignore zone, the defining of the ignore zone including defining a finite duration of the ignore zone, wherein an area of the ignore zone is large relative to a finger touch;

determining if a sensor reading in the sensor array exceeds a second sense threshold associated with detecting an object, wherein the second sense threshold is greater than the first sense threshold; and if the sensor reading exceeds the second sense threshold and the corresponding sensor is within the ignore zone, changing the duration of the ignore zone.

10. The method of claim 9, further including:

assigning a starting count to the ignore zone when the ignore zone is defined;

changing the count over time; and if the sensor reading exceeds the first sense threshold but not the second sense threshold and the corresponding sensor is within the ignore zone, resetting the count of the ignore zone.

11. The method of claim 9, further including:

if the sensor reading exceeds the second sense threshold and is outside of the ignore zone, generating a position value corresponding to the sensor.

12. The method of claim 9, wherein:

determining if a sensor reading in the sensor array exceeds a sense threshold includes measuring a capacitance of the sensor.

13. The method of claim 9, wherein:

defining the ignore zone includes defining at least a rectangle that includes a border of sensor locations extending beyond those corresponding to the object.

14. The method of claim 9, further including:

the sensor array is divided into groups of sensors contiguous with one another; and defining the ignore zone includes if at least one sensor corresponding to the object is within a group, defining the group as an ignore group, and assigning a duration value to the ignore group; wherein the ignore zone includes the ignore groups.

15. A system, comprising:

a sense circuit configured to generate sense values corresponding to properties of each sensor in a sensor array, the properties of each sensor varying in response to proximity of objects;

a controller circuit coupled to at least the sense circuit and configured to generate object position values in response to the sense values and an object threshold, and define an ignore zone that includes at least the object position values that meet or exceed a first sense threshold used to define the ignore zone and a duration value for the ignore zone, wherein the first sense threshold is less than a second sense threshold used for detection of normal touches and wherein an area of the ignore zone is large relative to a finger touch; and a memory configured to store positions and durations of ignore zones.

16. The system of claim 15, wherein:

the sense circuit comprises a capacitance sense circuit that senses a capacitance of each sensor in the sensor array.

17. The system of claim 15, wherein:

the controller circuit comprises a processor and an instruction memory.

18. The system of claim 15, wherein:

the sensor array comprises a touch screen having a transparent sensor array formed over a display screen.

19. The system of claim 15, wherein:

the controller is further configured to define the ignore zone to include the object position values and a border region surrounding the object position values.

20. The system of claim 15, wherein:

the controller is further configured to reset a duration of an ignore zone in response to sensing at least one object in proximity to the ignore zone.

* * * * *

UNITED STATES PATENT AND TRADEMARK OFFICE

CERTIFICATE OF CORRECTION

PATENT NO. : 9,632,612 B2
APPLICATION NO. : 13/431401
DATED : April 25, 2017
INVENTOR(S) : Kyrynyuk It is certified that error appears in the above-identified patent and that said Letters Patent is hereby corrected as shown below:

In the Claims

Claim 1, Column 12, Line 52, please delete "surrounding a least" and insert --surrounding at least--.

Signed and Sealed this
Twenty-seventh Day of June, 2017

Joseph Matal

Joseph Matal
*Performing the Functions and Duties of the*
*Under Secretary of Commerce for Intellectual Property and*
*Director of the United States Patent and Trademark Office*